Dec. 3, 1968 W. G. MARTIN ET AL 3,414,215
AUTOMATIC SEEKER GAIN CALIBRATOR
Filed March 21, 1966

INVENTORS
WILLIS G. MARTIN
ROY F. DUTTON
BY
*Julian C. Renfro*
ATTORNEY

United States Patent Office 3,414,215
Patented Dec. 3, 1968

3,414,215
AUTOMATIC SEEKER GAIN CALIBRATOR
Willis G. Martin and Roy F. Dutton, Orlando, Fla., assignors to Martin-Marietta Corporation, New York, N.Y., a corporation of Maryland
Filed Mar. 21, 1966, Ser. No. 535,862
11 Claims. (Cl. 244—3.15)

ABSTRACT OF THE DISCLOSURE

This invention relates to an automatic seeker gain calibrator arrangement, particulraly adapted for use in missile guidance, in which means are provided for calibrating the seeker gain characteristic by adjustment of the gain of a multiplier operating on the seeker output signal so as to eliminate any residual body attitude rate signals in the steering signal.

---

The present invention relates to guidance systems for vehicles, particularly missiles.

Simplified missile guidance systems, particularly those employing inertial guidance, require highly accurate information to be preset into the system on launch. While target azimuth information is generally accurately available, range and altitude of the target is usually much more approximately known in many instances. Such guidance systems, consequently, while of high utility where the necessary information is available, are not adapted for efficient use in many unexpected situations or where a very accurate guidance is needed.

In order to avoid such deficiencies, highly sophisticated seeker systems have been evolved for mounting on the missile to maintain a continuous input of target direction information during flight. Some such systems employ seekers gimbaled on the missile for obtaining directional and range information, with attendant mechanical and system complexity. Other solutions of these guidance problems have employed seekers rigidly mounted on the vehicle to avoid complications of the gimbaled seekers, but such systems impose severe requirements on the seekers when used with missiles employing guidance laws that control missile velocity direction, as in proportional navigation or constant bearing guidance systems. On the other hand, the use of body fixed seeker installations with guidance laws that point the missile centerline toward the target, may relax some stringency on the demands placed on the seeker design, but at the cost of compromising missile design and/or performance.

The present invention provides greatly enhanced accuracy of guidance in systems provided with a fixed seeker mounted on the missile, while at the same time permitting the system to control or program missile velocity direction.

Rigidly mounted seekers provide an output signal characteristic of the angles of the target (line of sight) from the missile centerline. Such systems necessarily employ a wide field of view, and seeker output signal magnitude, if permitted to change from its intended correlation with direction, introduces basic errors into the over-all guidance system. The present invention provides means for detecting and correcting a major component of such errors which, in inertial referenced guidance systems controlling missile velocity direction, results in missile attitude oscillation.

The present invention is directed to systems in which the body referenced angles in pitch and yaw from a fixed seeker are processed to obtain the corresponding steering command signals. This is accomplished by resolving the seeker supplied information with respect to body attitude angle information derived from inertially stabilized attitude references giving missile attitude angles with reference to the arbitrarily inertially fixed reference. This process results in signals proportional to the two components of the angle between the line of sight vector and the inertially fixed reference. The steering signals are generated by differentiating the two inertially referenced line of sight angles with respect to time. When the missile responds to these steering signals, its velocity vector is controlled relative to the line of sight vector to align the vectors and point the velocity vector toward the target.

It is accordingly the object of the present invention to provide means for correcting seeker gain responsive to a selected error component in the guidance signals to null the seeker output error.

The invention will be further described in connection with a specific embodiment disclosed in the accompanying drawings, in which.

Figure 1:
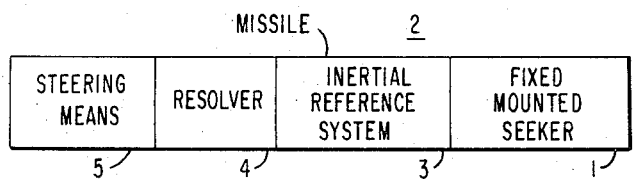
FIGURE 1 shows in diagrammatic form a vehicle guidance system incorporating the present invention.

As shown in FIGURE 1, guidance systems of the present invention include a rigidly mounted fixed seeker 1 carried by missile 2 which is furnished with an inertial reference system 3, and resolver components 4 responsive to the seeker and reference system ouputs to operate the missile steering system 5. The system resolves the seeker angle information through the inertially referenced missile body angles to determine the line of sight angles in inertial space. The inertially referenced line of sight angles are used to derive the steering signals. The resolution essentially removes the missile attitude motion from the seeker angles.

Figure 2:
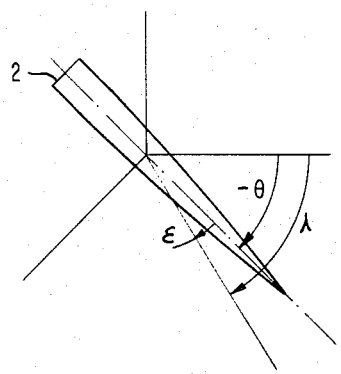
FIGURE 2 shows the coordinate systems of an embodiment of the present invention.

In respect to the coordinate systems, as delineated in FIGURE 2, considering the vertical plane, where the missile has a zero roll angle and the seeker line of sight angle in yaw is zero, the pitch resolution reduces to the following equation:

$$\lambda = \epsilon - \theta$$

where $\lambda$ is the inertially referenced line of sight angle, $\epsilon$ is the angle between the missile longitudinal axis and the line of sight vector, and $\theta$ is the missile pitch attitude. As indicated in the equation, any errors or perturbations in the angle measurement results in noise on the guidance signal.

One of the most critical tolerance parameters is the slope or local gain of the seeker. Usually, the line of sight angle, $\lambda$, is differentiated and used to command missile acceleration or turning rate. Thus, the steering command is given as follows:

$$\text{Pitch steering} = K\dot{\lambda} = K(\dot{\epsilon} - \dot{\theta})$$

where K is the usual proportional navigation gain constant.

However, if the seeker has the wrong gain $(1+\delta$ instead of 1,) then Pitch Steering becomes $$K\dot{\lambda}' = K(\dot{\epsilon}' - \dot{\theta})$$

Where:

$$\dot{\epsilon}' = \dot{\epsilon}(1+\delta) = (\dot{\lambda} + \dot{\theta})(1+\delta)$$

So:

$$\text{Pitch steering} = K\dot{\lambda}' = K[\dot{\lambda}(1+\delta) + \delta\dot{\theta}]$$

The erroneous steering signal contains a relatively small error on the line of sight rate term resulting from the erroneous seeker output gain, but more importantly contains a major body attitude rate error term resulting from the seeker gain error, which can interfere with the autopilot rate feedback which is used for attitude damping. The latter error signal component can make the missile very sluggish or very oscillatory, dependent upon the sign of the main gain error.

The more significant error component of the degraded steering signal is selectively derived therefrom, by cross-correlating with an attitude rate signal to produce a D.C. term which is proportional to the product of the square of the amplitude of the attitude oscillation and the error, $\delta$. This D.C. term is integrated and used to adjust the gain of the seeker and drive the error, $\delta$, to zero.

Figure 3:
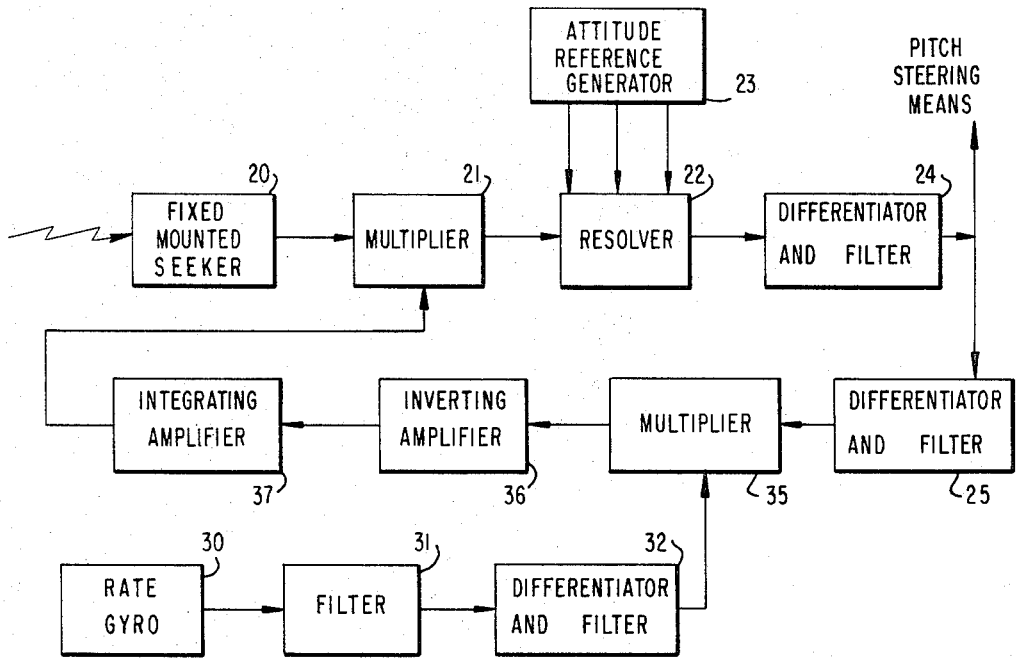
FIGURE 3 shows in block diagram the essential circuitry of the present invention.

In the system shown in FIGURE 3 of the drawings, a rigidly mounted seeker is shown at 20. This system provides an output signal having an amplitude charactering the direction of the target with respect to the seeker axis, which reference direction is usually aligned with the missile axis. The seeker system may be a passive directional radiant energy receiving means, such as an infrared receiver or a radio frequency direction finding apparatus. It may, of course, embody where desirable active components, although the advantages of the present system are fully derivable with passive seekers.

As noted, the seeker provides directional target information with reference to instantaneous missile coordinates. Its output signal is applied through a controlled multiplier or signal level adjuster 21 to resolver 22. Resolver 22 receives attitude reference signals from attitude reference generator 23 which may comprise an inertial device such as a 3-axis attitude reference platform. So far as disclosed in FIGURE 3, only the pitch steering component circuitry is illustrated, it being understood that a similar configuration may be simultaneously employed for yaw control, where desired.

In the pitch steering channel, the steering signal supplied by resolver 22 is applied to differentiator and filter 24. If the input from seeker 20 to resolver 22 is properly proportional to the angle between the missile longitudinal axis and the line of sight vector, the resolved output accurately represents the angle between the line of sight vector and the inertial reference. However, the boresight errors in the seeker, if present, will produce a bias component in the inertial line of sight angle. The differentiation effected at 24 removes the bias errors, and additional filtering provides the desired pitch steering signal for operating pitch steering means 5, as shown in FIGURE 1.

If, however, the output of the seeker 20 is not supplied to the resolver 22 at the proper gain, the scale factor or gain error will, as disclosed above, produce an error output proportional to the missile attitude angle and this signal is delivered by differentiator 24 to the pitch steering means components 5 as rate of change of missile attitude. Also, errors in seeker gain affect the guidance gain.

In order to select the attitude rate error component of the pitch steering signal, in accordance with our invention the steering signal is again differentiated and filtered at 25 to remove any line of sight angle rate biases. Consequently, the output of differentiator and filter 25 is oscillatory in nature and dependent on the rate, if any, of vehicle attitude change in the pitch plane and high frequency noise.

In order to cross-correlate this steering signal error component with the missile attitude oscillation, a missile-mounted rate gyro 30 is provided to supply this necessary signal, $\theta$. In most instances, such a signal may be derived from the gyro system normally employed to provide missile attitude damping augmentation. It is necessary that the attitude rate component be derived in a form coherent with the error signal from the steering signal channel, and for this purpose, the output of rate gyro 30 is first filtered at 31 with substantially the same time constant as was used to process the guidance signal at filter 24. The output of filter 31 is then differentiated with substantially equal time constant circuitry as that of differentiator 25. This removes any bias which may be present upon the $\theta$ signal, while retaining the phase relationship to provide, again, an output signal oscillatory in nature when present, and characterizing the rate of change of missile attitude in the pitch plane.

The outputs from differentiator and filters 32 and 25 are then cross-correlated in multiplier 35, to detect a component of body attitude motion in the steering signal, which is the output of filter 24. The presence of this component is indicative of the fact that the gain of the seeker 20 is in error, so to compensate for this error, the gain of multiplier 21 must be adjusted. When one oscillatory signal is multiplied by another, it is well known that sum and difference frequencies result as follows:

$$[A \cos \omega_1 t][B \cos (\omega_2 t + \phi)] = \tfrac{1}{2}\{AB \cos [(\omega_1 + \omega_2)t + \phi] + AB \cos [(\omega_2 - \omega_1)t + \phi]\}$$

In the present instance, the error frequency, if present, is the same as the body attitude rate frequency from rate gyro 30, so that the output of multiplier 35 contains a D.C. signal resulting from the second term of the above equation. Seeker noise at frequencies other than the body attitude rate frequency will have a difference frequency other than zero and therefore will not produce a D.C. output from multiplier 35. Integration of the multiplier output, therefore, produces a control signal independent of the alternating components resulting from the first term, or from unequal frequency components producing difference frequencies according to the second term, and selectively characterizing only the steering error components resulting from body attitude rate produced by seeker gain error. In the arrangement shown in FIGURE 3, this is accomplished by integrating amplifier 37 receiving the multiplier output through inverting amplifier 36. In the particular application, the inversion performed at 36 was desirable to assure loop stability.

The transfer functions of the signal handling components may be as follows:

$$24: \frac{ks}{1+t_1 s}$$

$$25: \frac{t_2 s}{1+t_2 s}$$

$$31: \frac{1}{1+t_1 s}$$

$$32: \frac{t_2 s}{1+t_2 s}$$

$$37: \frac{k}{s}$$

The integrator output controls the effective seeker gain by application to multiplier 21 through which the effective level of the seeker signal is corrected for application to resolver 22. In the presence of an undesired signal component of the pitch steering signal, therefore, the integrator continues to drive and adjust the seeker gain or scale factor until the D.C. input at the integrator is reduced to zero. This is accomplished when the seeker scale factor is correctly adjusted. The $\delta$ error term is thus driven to zero, and the system effectively carries out the desired guidance program under inertial reference and missile body fixed seeker directives.

As noted above, while only pitch steering channel has been described, a similar configuration may be employed for yaw steering control where desirable or necessary.

It will be understood that a preferred exemplary embodiment of the invention has been disclosed, but that the scope thereof will be construed with respect to the appended claims.

We claim:
1. In an augmentation device for a guidance system comprising:
   inertial attitude reference means;
   seeker means operative to supply a directional signal characteristic of missile deviation from a desired direction, steering means mounted on the missile operative to control missile direction, inertial reference resolving means responsive to the output of an inertial reference means and the seeker means output and operative to supply a guidance signal for operating the steering means, signal selective means for deriving from the seeker means output signal an error component output signal dependent on rate of missile attitude change in the said plane, missile mounted means for supplying an output signal dependent upon rate of missible attitude change, the improvement comprising, variable gain control network means transmitting the directional signal to the resolving means in dependency on a signal correlative to the product of the output signals from the signal selective and missile mounted means.

2. The structure of claim 1 further including first differentiating means connecting the resolving means to the steering means and the signal selective means.

3. The structure of claim 2 wherein the signal selective means comprises second differentiating means.

4. The structure of claim 3 wherein the missile mounted means comprises a rate gyro.

5. The structure of claim 4 wherein the missile mounted means further comprises third differentiating means having operational characteristics similar to those of the first differentiating means.

6. The structure of claim 5 wherein the variable gain control network means comprises first multiplier means for receiving signals from the second and third differentiating means.

7. The structure of claim 6 wherein the gain control network means further comprises integrating means receiving an output signal from the first multiplier means to correct for seeker error guidance signals.

8. The structure of claim 7 wherein said variable gain control network means further comprises second multiplier means responsive to the outputs of the integrating means and the seeker means to correct for seeker error guidance signals.

9. The structure of claim 1 wherein the gain control network means comprises integrating means.

10. In a missile having a guidance and control system utilizing a seeker to provide a guidance output signal characteristic of missile deviation from a desired path, and an inertial reference system including means for resolution of the seeker signals and to provide the necessary steering signals, means for detecting a signal component caused by body attitude motion in a steering signal resulting from gain error of the seeker, and means for correcting the effect of seeker gain error on the missile guidance output signal as a function of the detected body attitude motion in the steering signal.

11. In a missile having a guidance and control system utilizing a seeker to provide a steering signal characteristic of the missile deviation from a desired path, and an inertial reference system to accomplish resolution of the seeker signals and to provide the necessary steering signals, means for detecting a signal component caused by body attitude motion in a steering signal resulting from gain error of the seeker, multiplier means for performing a cross-correlation of body attitude motion signals with the steering signal, to produce a DC signal, integrator means for accumulating and integrating the signal from said multiplier, and means for correcting the effect of seeker gain error on the missile guidance output signals as a function of the output of said integrator means.

References Cited

UNITED STATES PATENTS

| | | | |
|---|---|---|---|
| 2,557,401 | 6/1951 | Agins et al. | 244—3.11 |
| 2,826,380 | 3/1958 | Ketchledge | 244—3.16 |
| 3,065,931 | 10/1962 | Dixon et al. | 244—3.16 |
| 3,188,958 | 6/1965 | Burke et al. | 244—3.14 |

BENJAMIN A. BORCHELT, *Primary Examiner.*

T. H. WEBB, *Assistant Examiner.*